United States Patent
Greene

(10) Patent No.: US 11,941,446 B1
(45) Date of Patent: Mar. 26, 2024

(54) REDUCING EXTRANEOUS MESSAGES IN A DISTRIBUTED LOCK SYSTEM

(71) Applicant: Dell Products L.P., Round Rock, TX (US)

(72) Inventor: Gavin Greene, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 49 days.

(21) Appl. No.: 18/046,033

(22) Filed: Oct. 12, 2022

(51) Int. Cl.
*G06F 9/50* (2006.01)
*G06F 9/52* (2006.01)

(52) U.S. Cl.
CPC .............. *G06F 9/5016* (2013.01); *G06F 9/52* (2013.01)

(58) Field of Classification Search
CPC .................................. G06F 9/5016; G06F 9/52
See application file for complete search history.

(56) References Cited

U.S. PATENT DOCUMENTS

| | | | | |
|---|---|---|---|---|
| 6,697,901 B1 * | 2/2004 | Shun Chan | ......... | G06F 11/1492 710/200 |
| 2019/0146845 A1 * | 5/2019 | Shen | ......... | G06F 9/46 718/104 |
| 2021/0117235 A1 * | 4/2021 | Kronrod | ......... | G06F 9/526 |

* cited by examiner

*Primary Examiner* — Henry Tsai
*Assistant Examiner* — John B Roche
(74) *Attorney, Agent, or Firm* — Amin, Turocy & Watson, LLP

(57) ABSTRACT

The technology described herein is directed towards reducing resource-related messages in a distributed locking system in which exclusive locks can be granted. Requests for a resource lock or range thereof received during an interval are queued, along with lock release messages. The queue is processed after the interval to update the resource state, which can result in a reduction in messages. In one example, separate lock request messages received during an interval from the same requestor for two or more consecutive resource ranges are combined, whereby a single lock grant message for the combined resource ranges is sent instead of one for each request. In another example, if in an interval a lock request for a resource/range is received before a lock release, the lock is released before the lock request message is processed. This avoids sending a lock release request message to the previous owner.

20 Claims, 13 Drawing Sheets

REDUCING EXTRANEOUS MESSAGES IN A DISTRIBUTED LOCK SYSTEM

BACKGROUND

In a distributed resource environment having a distributed locking system in which exclusive locks are used, an exclusive lock grants a lock owner exclusive access to a shared resource, such as a piece of data. The lock owner retains the lock until the owner completes a resource-related task, and then releases the lock. However, lock system throughput can be a bottleneck in large systems, such as a system with many concurrent lock requestors and lock owners.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
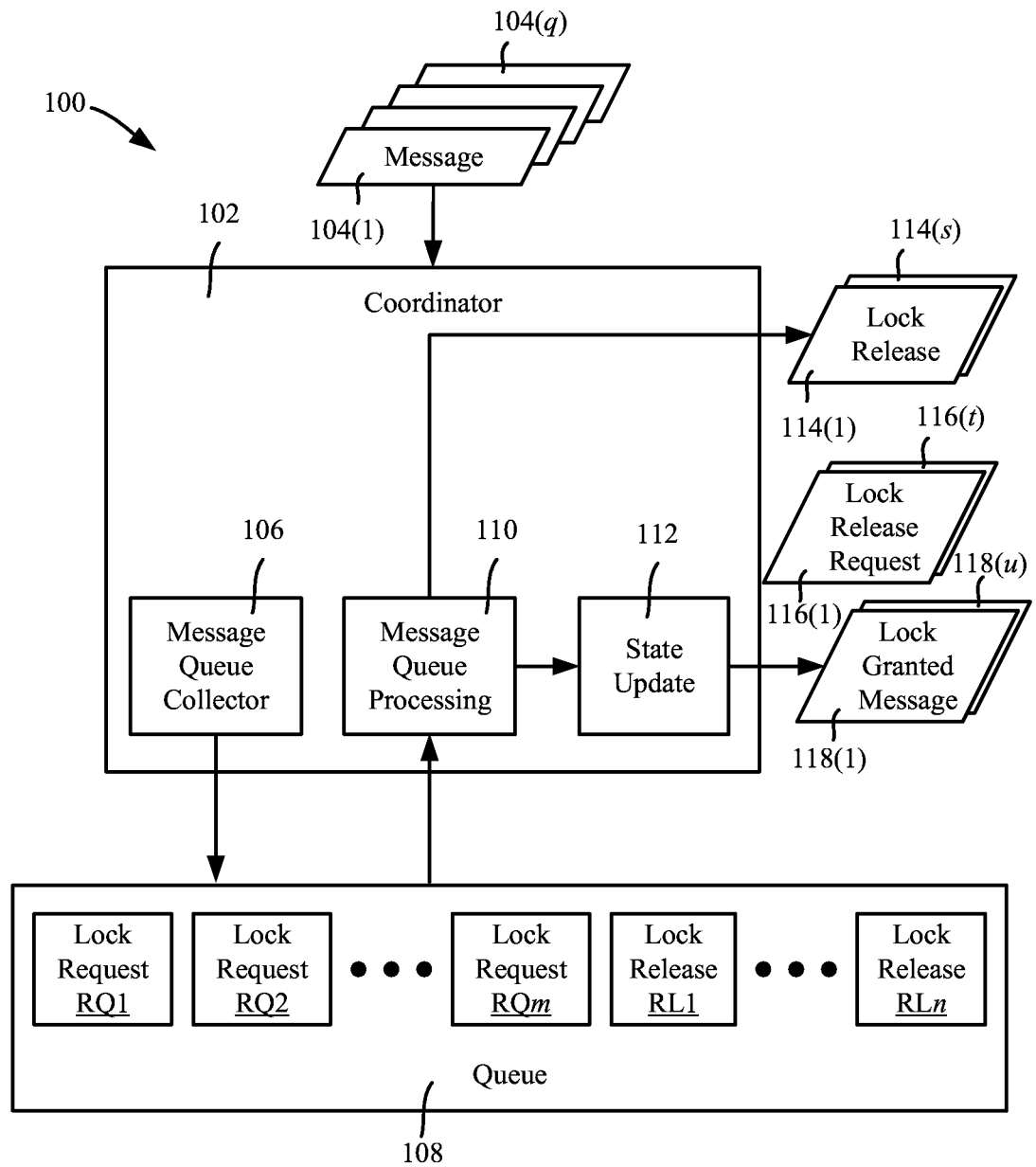
FIG. 1 is a block diagram representation of a locking system of example components by which a lock coordinator queues lock request messages and lock release messages for subsequent processing, in accordance with various aspects and implementations of the subject disclosure.

Various aspects of the technology described herein are generally directed towards reducing the number of lock-related messages sent in a distributed locking system having exclusive locking capabilities. The reduction of messages improves the performance and reduces the bottlenecks that result from message passing in a large resource locking system. Note that the system can be a shared/exclusive system; e.g., a resource may be locked in a way that is compatible with other shared lockers, but protects from exclusive lockers (such as with reads) or, a resource may be locked in a way that excludes all other lockers and protects from shared lockers and exclusive lockers (such as with writes). Further, there can be ranges with respect to locks; e.g., adding data ranges divides the resources further, in which shared lockers can share a range on the same resource, and lockers can share a resource as long as the ranges do not intersect.

As will be understood, messages are queued during an interval, and are not processed until after the interval. This can result in combining separate requests (e.g., for two or more consecutive ranges) from the same requestor (sometimes referred to as an "initiator") for the same resource lock, whereby only a single lock granted message need be sent. This also can result in receiving a lock granted message even when a lock release message is received for a resource (or range thereof) after a request for the resource/range is received, by processing the lock release first, whereby a lock granted message can be sent without requesting that the lock be release by the previous owner; (because the system recognizes that the lock was released during the interval). In one implementation, the technology provides significant benefits with respect to message passing efficiency, particularly with a distributed lock system in which coordination actors (e.g., lock coordinators) are often on different machines than the initiators requesting the lock-related operations.

In general, the technology described herein creates a queue to buffer lock-related operation requests. The queue allows splitting a lock operation into two parts, namely an "ask" lock operation portion, e.g., a requestor needs a particular lock, or a lock owner no longer needs a lock), and an idempotent lock operation (update the state of the locks and resources as a result of this update operation). To this end, for a given time interval, the lock-related requests, or "asks" in the buffer are first processed, with a single update call performed at the end of the interval.

It should be understood that any of the examples herein are non-limiting. Thus, any of the embodiments, aspects, concepts, structures, functionalities or examples described herein are non-limiting, and the technology may be used in various ways that provide benefits and advantages in distributed computing in general. It also should be noted that terms used herein, such as "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example locking system 100 including a coordinator 102 that receives lock-related messages 104(1)-104(q) for a group of resources. Note that a large domain of resources (e.g., system objects such as data files) may be hashed into different buckets to make the message thread-based processing more practical and efficient via multiple resource instances, which can be on multiple nodes.

In general, the coordinator portion 102 of the lock system 100 handles processing lock-related operations (each obtained by the coordinator as a message) including lock request operations and lock release operations on resources. In general, for a resource that is an object, a resource can have an identifier (e.g., unique to a resource domain) and a range. For example, a resource identifier for a data lock can comprise a block address, and the range represents a byte offset inside the block. In one implementation, the system 100 allows for contending lock types inside the same resource, so long as the ranges do not overlap.

The resource-related messages 104(1)-104(q) that are ultimately handled by the coordinator 102 can be considered as having two distinct resource change parts, namely one in which a waiter (e.g., identified by a requestor entity and range, which can be the entire resource) is added to a resource via a lock request, and another in which a lock owner is removed from the resource (lock release). A waiter is not granted the requested lock when there is a lock on the resource range, until the lock owner releases that lock; that is, when a lock request on the same resource contends with a lock owner.

The state maintained by the coordinator 102 is updated (block 112) to reflect the resource changes. This can result in one or more lock waiters being granted the lock (the resource has one or more waiters that are able to be granted the lock), or one or more lock holders being asked to give up the lock(s).

In existing prior systems, lock-related messages were handled in the order received. While this generally provided fairness, there are inefficiencies with such a coordinator. For example, consider that a requestor R requests a first lock on resource X specifying the range [0-9], and also that the requestor R requests a second lock on resource X specifying the range [10-20]. Assuming the locks can be granted, two separate lock granted messages are returned, one for each request. Messages are known to be inefficient, and depending on the request timing, sending both messages may be unnecessary as described herein.

In another example of prior systems simply handling messages as they are received, consider that the requestor R requests a lock on resource Y, but there is already a lock owned on that resource by an owner O. The lock may be released via a lock release message very shortly thereafter from the lock owner O, but because the lock was requested by R first, a lock release request message is sent to the owner O, and the lock release message is processed later, resulting in the lock grant message being sent to the requestor R; (note that in many systems, an ACK is not sent to the releasing lock owner O, but it is feasible to do so). Again, depending on the timing, the lock release request message may be unnecessary as described herein.

As shown in the example of FIG. 1, instead of processing messages in order as soon as they are received, messages received over an interval are queued. A message queue collector 106, incorporated into or coupled to the coordinator, queues the messages in a queue 108 (which can also be incorporated into the coordinator 102 or coupled to the message queue collector 106). Thus, the technology described herein collects a group of lock-related messages over an interval, resulting in the example of FIG. 1 as lock requests RQ1-lock request RQm and lock release RL1-lock release RLn being queued during one such example interval. An interval can be based on how long it takes a thread to execute a prior queue's lock-related operations, or can be a defined period of time, and/or based on queue size or message count (trigger when queue is almost full or enough messages are queued) and so on.

For each message collected in this interval, instead of executing the complete message, only the resource change portion is processed by message queue processing logic 110. Thus, lock release operations 114(1)-114(s) can be handled when encountered during the queue processing (although such messages may be internal to a coordinator), and waiters can be added to resources as described herein. However, until the queue 108 has been processed, there is no status update, and no locks are granted nor are lock release request messages sent to owners. Only upon completion of the queue processing, are these operations performed by state update logic 112 (e.g., an existing "wake waiters" function in one implementation) being called, resulting in lock release request messages 116(1)-116(t) being sent to lock owners for which a locked resource (e.g., range) has a waiter, and lock granted messages 118(1)-118(u) sent to lock requestors for which a requested resource (e.g., range) is not locked.

To summarize, after the resource change portion of the first message is complete, the next message in this interval is processed, and so on until the messages for this interval are complete. When all messages (or some limited number of messages, if some remain queued such as for time reasons) in an interval are processed, a singe locking state update 112 (e.g., "wake waiters") is performed once. The single state update 112 reflects the resource changes from messages over the interval.

With the technology described herein, the total state change update function call (or the like) is reduced to one call per interval, instead of one per lock request message. This reduces the number of calls, and in some cases provides a reduction in the total messages sent over the wire.

Indeed, considering one above-described example scenario, in a first example a lock request for the resource X and the range [0-9] is received from requestor R, and then another lock request from the same requestor (agent) R for the same resource X but range [10-20] is received in the same interval. The coordinator's message queue processing logic 110 processes the first lock request message and adds a waiter associated with the requestor R and range [0-9] to the resource X. At the end of the interval, the coordinator message queue processing logic 110 processes both the first and second lock requests received in the interval, and so on for other messages. When the operations in the interval are complete, a single state update (block 112) is performed for the interval.

Because the queue processing logic 110 allows combining requests from the same agent R for the same resource X, e.g., for consecutive (or possibly very close ranges if configured to do so, such as [0-9] and [11-20] combined to [0-20] even though was not requested), the technology described herein thus allows for a single lock granted message for the resource X with range [0-20] to be sent to the requestor R. This is in contrast to the existing model in which two separate lock granted messages [0-9], then [10-20] are sent, one each after the state update is processed for each message.

With respect to the other above-described example scenario, consider that inside the interval there is queued one lock request message for a resource Y (which could be a range of a larger resource) that is contended, and another lock release message from the owner of resource Y. After the lock release message is processed, the resource will no longer be contended, and thus the lock can be granted to the requestor. This is because regardless of the order received, the message queue processing logic 110 will process the resource change portion of the lock request message, and also process the resource change portion of the lock release message before the state update 112 call is made. A single state update applies to both the lock request and the lock release message in the interval, whereby the lock is released before or in conjunction with the waiter being processed, and because unlocked, a lock granted message will be sent to the requestor. In other words, because the message queue processing logic 110 processes both resource change operations before updating the state (block 112), the message to the previous lock owner need not be sent, and instead the lock can be granted without waiting for the (already received) release. Note that in prior message processing, both the resource update and the lock state change are processed for the lock request, and because this request cannot be granted, the system sends a message to the lock owner to request that the contending lock be released; only after the lock release message is received and processed, will a lock granted message will be sent to the lock requestor.

Figure 2:
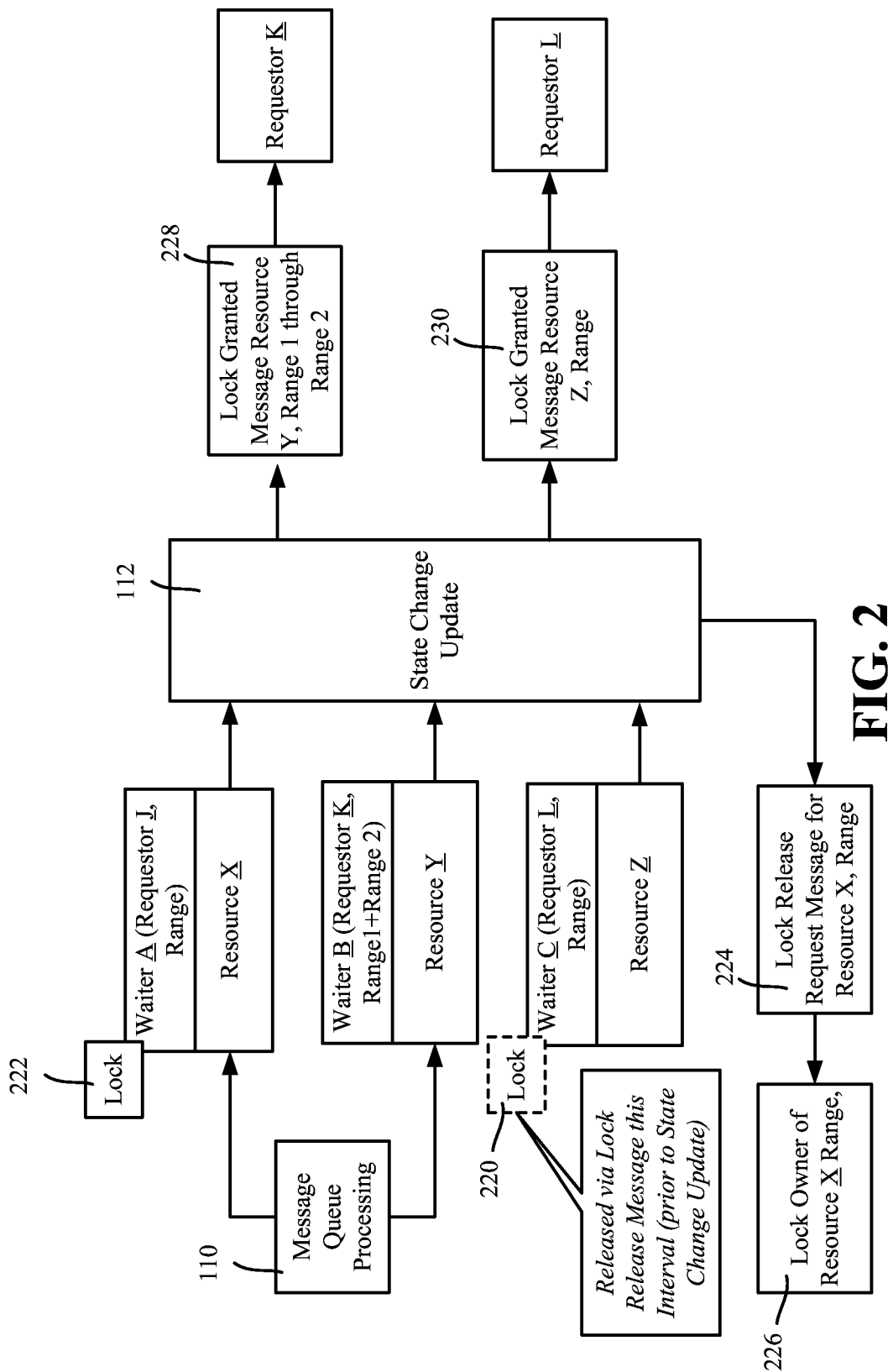
FIG. 2 is an example representation of a various results for lock message processing based on received messages, in accordance with various aspects and implementations of the subject disclosure.

FIG. 2 is a block diagram showing three resources X, Y and Z with respective waiters A, B and C, associated with respect requestors J, K and L. The waiters were added during the queue processing 110 of the queued messages for an interval; during the interval the lock owner released resource Z (as indicated via dashed block 220), however resource X remains locked (block 222).

When the state change update 112 is called, the existing lock 222 of the resource X results in the waiter A (requestor J) not being granted the lock, but instead results in a lock release message 224 being sent to the lock owner 226. Further, the waiter B on the resource Y, associated with requestor K and two separately requested, but now combined consecutive range requests (Range 1+Range 2), results in the requestor K receiving a single lock granted message 228 for the combined requested ranges. Further, because the resource Z (e.g., the requested range thereof) was released during the interval, the waiter B on the resource Y, associated with requestor L is no longer locked, and thus the with requestor L gets a lock granted request 230 for the resource Z.

Figure 3:
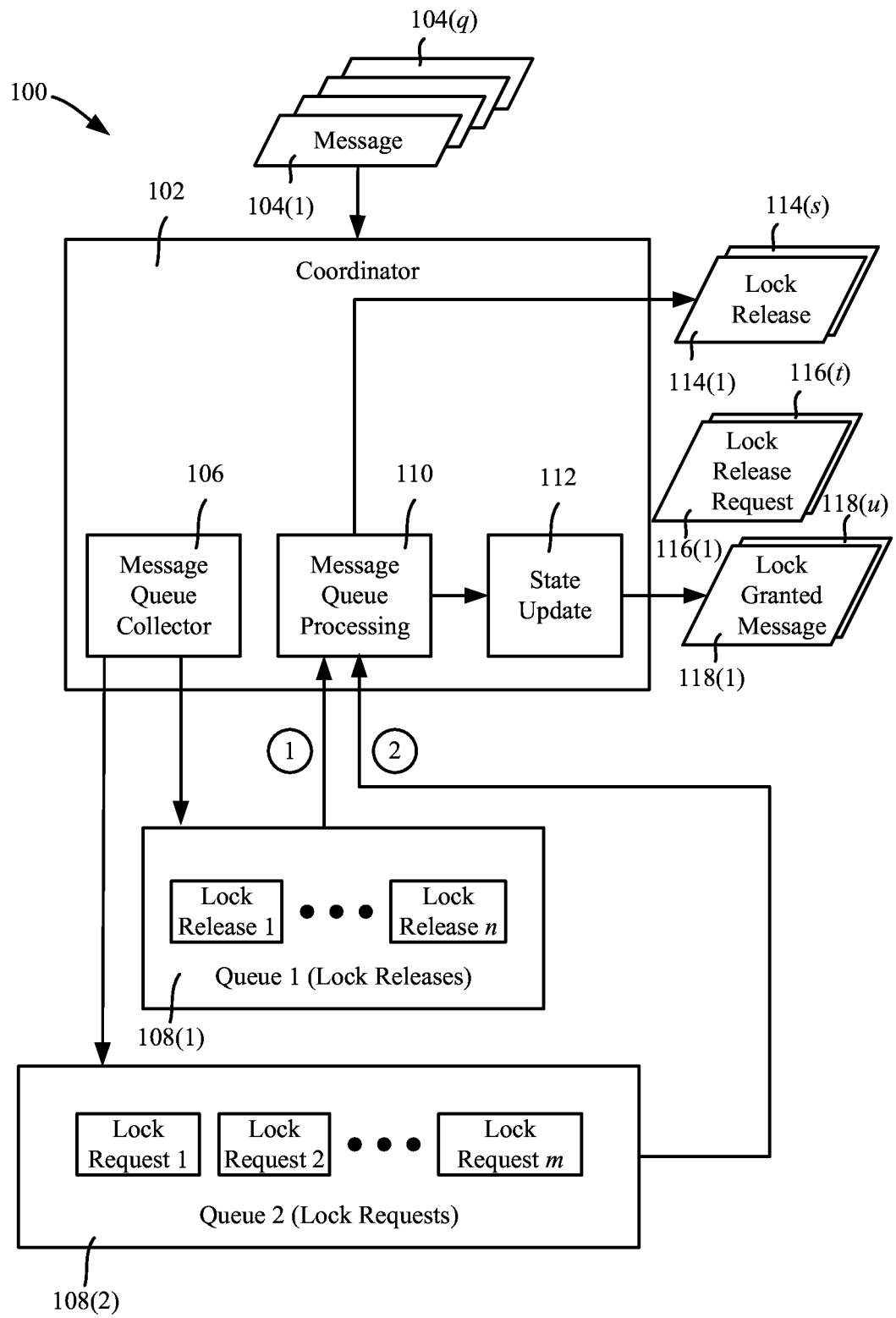
FIG. 3 is a block diagram representation of a locking system of example components by which a lock coordinator alternatively queues lock request and lock release messages in separate queues for subsequent processing, in accordance with various aspects and implementations of the subject disclosure.

FIG. 3 is similar to the example of FIG. 1, however the message queue collector 106 maintains two queues 108(1) and 108(2), for lock releases and lock requests, respectively. The message queue processing logic can process the lock releases queue first, which may be useful in systems in which the lock releases take some additional time, such as if ACKs are sent.

Figure 4A:
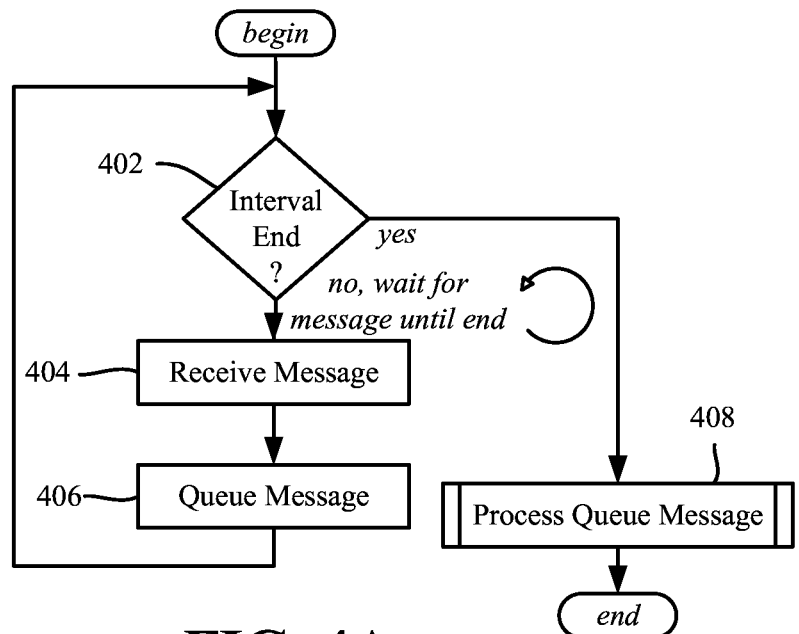
FIGS. 4A and 4B are example flow diagrams showing example operations related to handling resource lock-related input messages, including with queueing, in accordance with various aspects and implementations of the subject disclosure.

FIG. 4A is a flow diagram of example queuing operations, where until the interval is reached (operation 402), received messages (operation 404) are queued (operation 406). At the end of the interval, the queue (or possibly queues as in FIG. 3) is processed (operation 408) by the queue processing logic. It should be noted that other conditions, such a certain type of lock request in the same resource domain or other relatively infrequent messages, may result in the queue being flushed before the interval is reached.

Figure 4B:
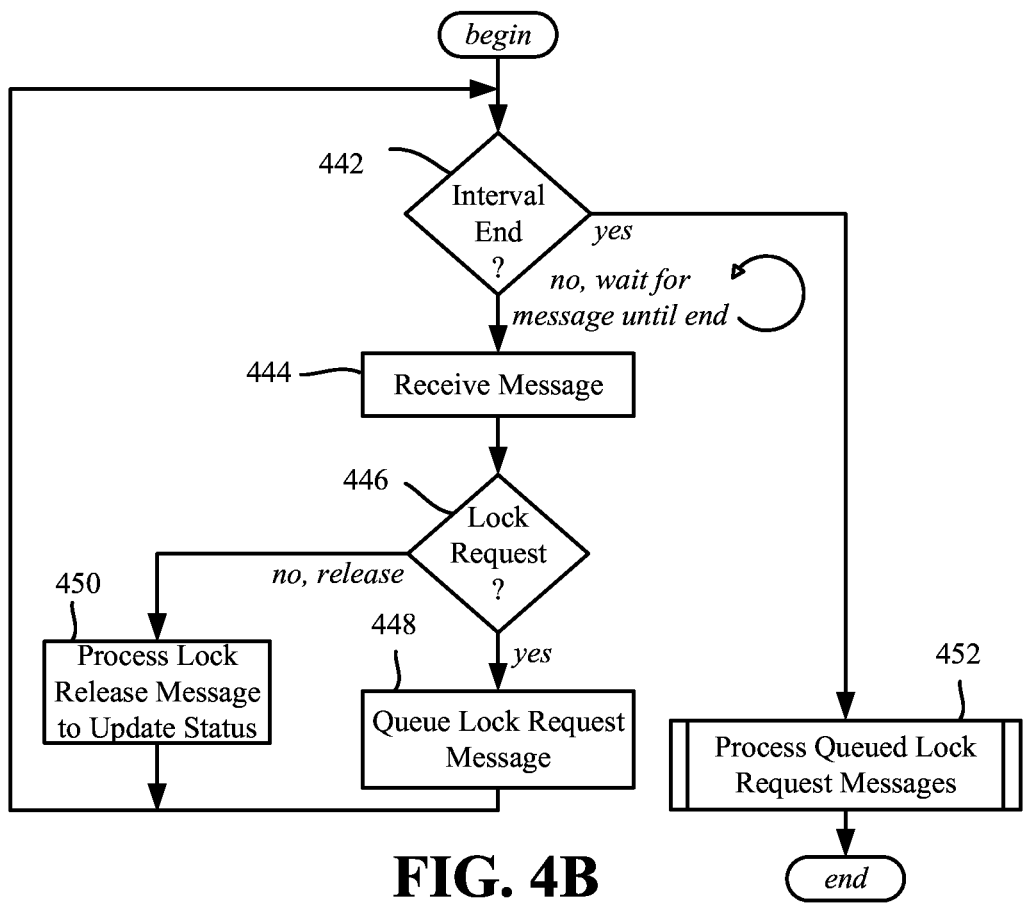

FIG. 4B is a flow diagram of alternative example queuing operations, where until the interval is reached (operation 442), received lock request messages (operation 444) are queued (operations 446 and 448), while lock release messages are not queued, but rather processed to update the status without further delay (operation 450). At the end of the interval, the queue, which in this alternative example only contains lock request messages, is processed (operation 452) by the queue processing logic. This alternative again guarantees that locks are released before any waiters for those released locks are updated, such as if lock releasing is slow.

Figure 5:
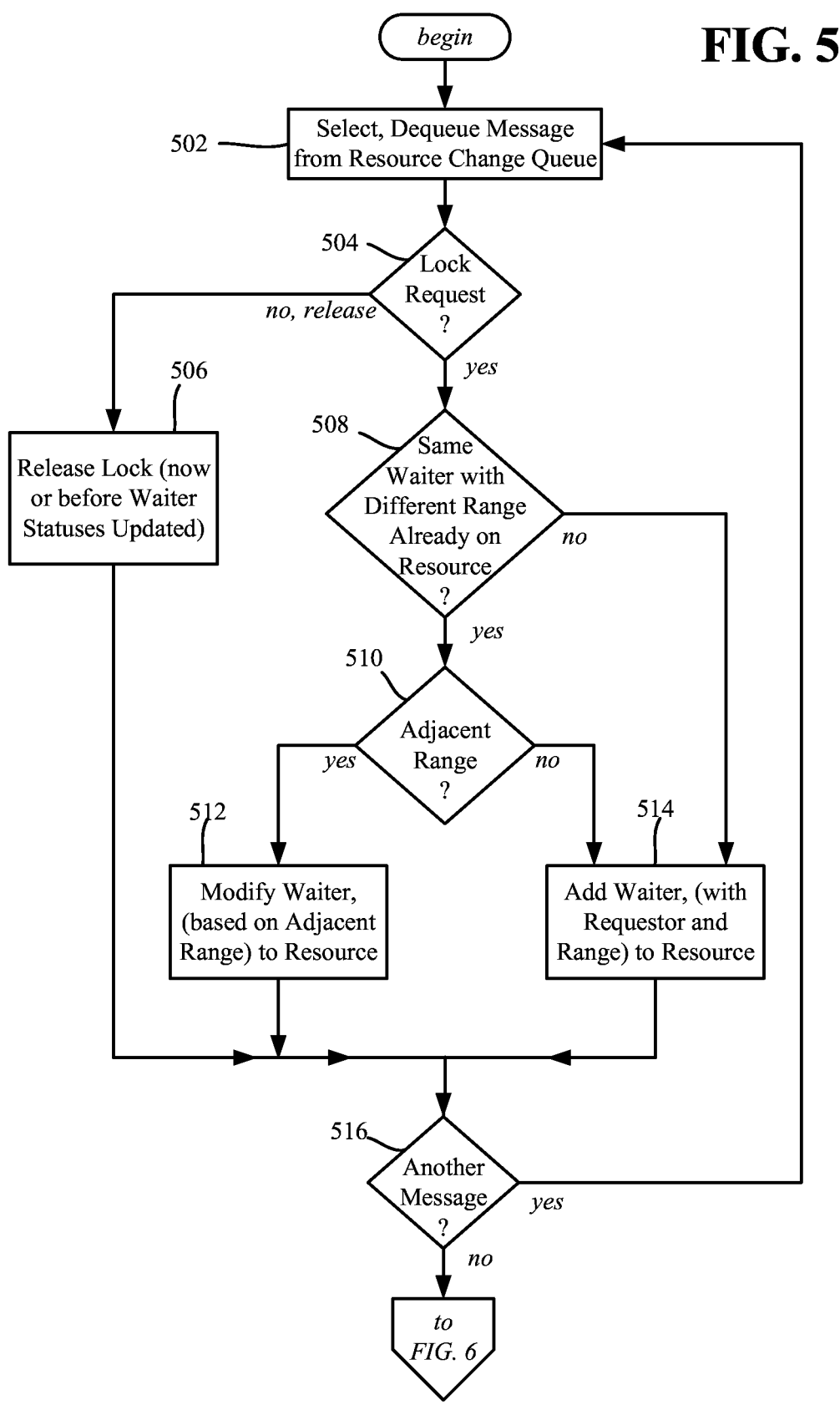
FIG. 5 is a flow diagram showing example operations related to processing queued lock release and lock request messages, in accordance with various aspects and implementations of the subject disclosure.

FIG. 5 is a flow diagram of example queue processing operations, where operation 502 selects and dequeues (actually, or by reading and moving a queue pointer or the like) the first message. Operation 504 evaluates whether the message is a lock request message. If not, in this example the message is a lock release message, whereby the lock is released via operation 506, e.g., sometime before the waiter statuses are updated, so that a released lock on a resource is known to the system without preventing a requestor anytime during the duration interval from being granted the lock, because the resource otherwise would be still considered locked. Note that a lock release request can be for a lock of a larger range when only a partial range is requested, e.g., a lock owner owns range [0-100] of a resource and range [30-39] is requested, the lock release request can only be for range [30-39].

For a lock request message, operation 508 evaluates whether there already is a same waiter (including the same requestor) on the same resource, for a different range. If so and the range is adjacent at operation 510, the queue processing logic modifies the existing waiter to include the adjacent range via operation 512. This can include filling in a range gap, e.g., if [0-9] and [21-30] are already waiters on a resource Z with the same requestor, and [10-20] is requested on Z by the same requestor, both existing ranges can be merged with the new range, e.g., a single waiter for range [0-30]. In theory, an overlapping resource request for the same requestor can be combined, e.g., a requestor requests range [0-9] and also requests range [8-15] for the same resource, whereby a single waiter for range [0-15] can be added. If not the same waiter/requestor at operation 508, or if not an adjacent range at operation 510, operation 514 adds the waiter and associated request and range to the resource.

Operation 516 repeats the process for the next message and so on, until the queue is fully processed. Once the queue has been processed, the operations of FIG. 6 can be performed to perform the state update. Note that the order of resource requests is preserved, which facilitates fairness.

Figure 6:
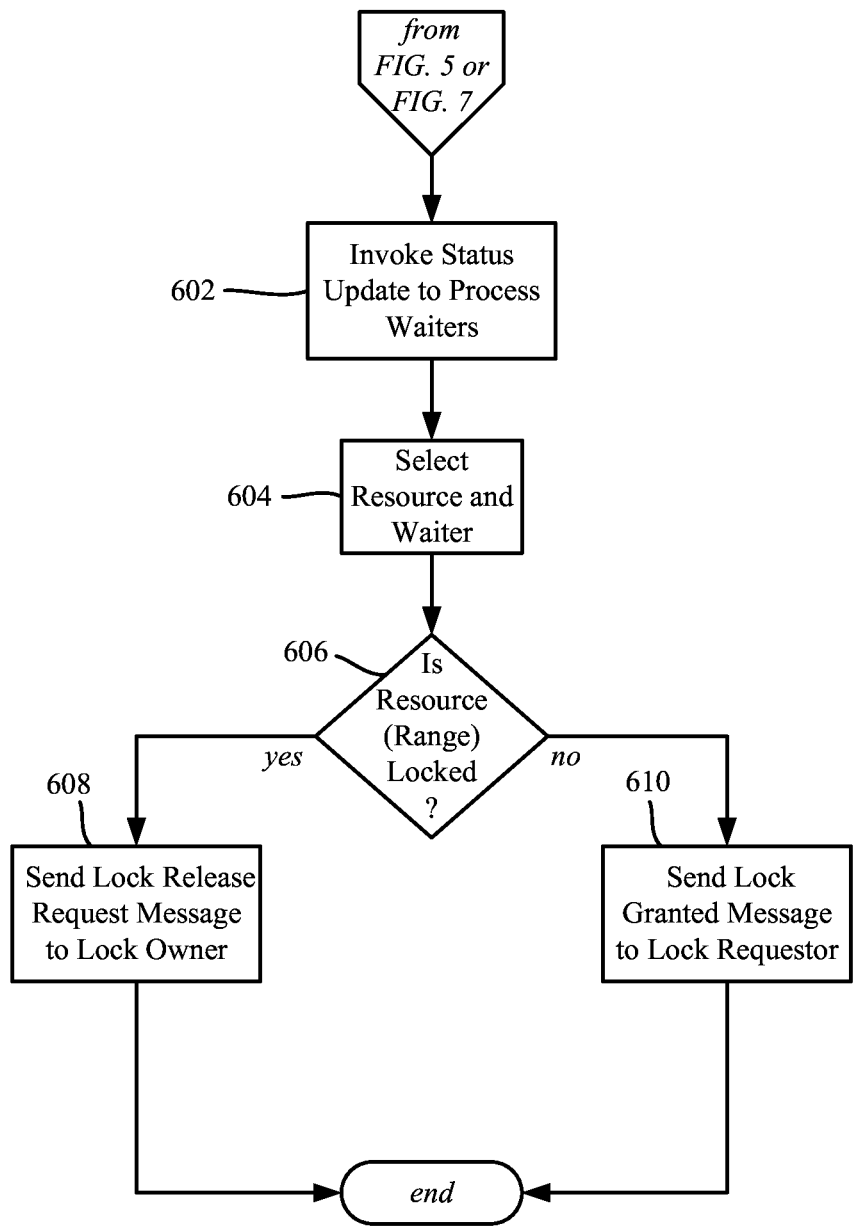
FIG. 6 is a flow diagram showing example operations related to invoking a status update function to update resource waiters waiting for a resource lock, in accordance with various aspects and implementations of the subject disclosure.

FIG. 6 is a flow diagram of example status update operations, beginning at operation 602 where the status update is invoked, e.g., via a function call. In one implementation, an existing function call basically performs operations 604-610, but operations 604-610 can be performed otherwise by another system. Note that FIG. 6 assumes that the lock release requests have already been performed; if not, however, any time a resource with a waiter is selected (operation 604), a lock release operation, if pending for the resource, can be found and performed as part of operation 604.

Note that in this example, operation 606 evaluates whether a lock on the resource for which there was a waiter (that owns the requested range) still exists, or was just added by updating the status based on granting a lock to a waiter added earlier in the interval. If so, operation 608 sends a lock release message to the lock owner. If no lock is present, operation 610 sends a lock granted message to the requestor associated with the waiter for the specified range.

Figure 7:
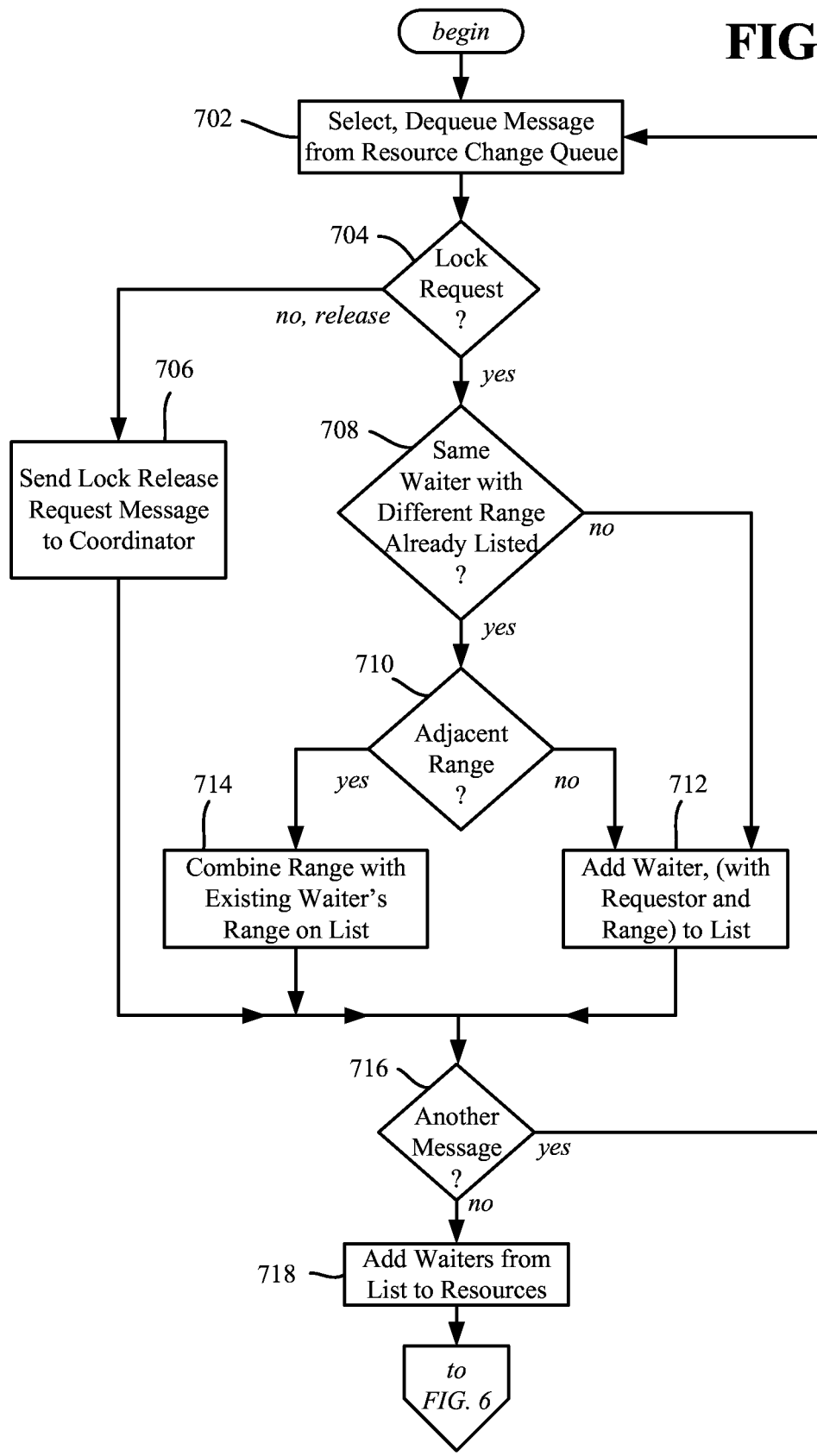
FIG. 7 is a flow diagram showing example operations related to processing queued lock release and lock request messages, including combining adjacent ranges of a common waiter for the same resource, in accordance with various aspects and implementations of the subject disclosure.

FIG. 7 is similar to FIG. 5, but is based on alternative system in which a waiter on a resource cannot be modified (as in FIG. 5), whereby any merging of resource requests with consecutive ranges by the same waiter is performed before adding the waiters to a resource. Thus, operation 702 selects and dequeues the first message, and operation 704 evaluates whether the message is a lock request message. If not, in this example the message is a lock release message, whereby the lock is released via operation 706, e.g., sometime before the waiter statuses are updated, so that a released lock on resource is known to the system coordinator or the like without preventing a requestor from being granted the lock because the resource is still considered locked.

For a lock request message, operation 708 evaluates whether the waiter/requestor, once added to the resource from a pending waiter list, is already listed as a pending waiter so as to have a waiter on the same resource for a different range. If not the same waiter/requestor at operation 708, or if not an adjacent range at operation 710, operation 712 adds the waiter and associated request and range to a temporary pending waiter list. If there already is a listed waiter at operation 708 and the range is adjacent another pending waiter (including the same requestor) at operation 710, because in this example the queue processing logic cannot modify an existing waiter to include the adjacent range, the range is combined on the pending waiter list via operation 714. This also can include filling in a range gap, e.g., if [0-9] and [21-30] are already waiters on a resource Z with the same requestor, and [10-20] is requested on Z by the same requestor, both existing ranges can be merged with the new range, e.g., into a single waiter for range [0-30] on the pending waiter list.

Operation 716 repeats the process for the next message and so on, until the queue is fully processed. Once the queue has been processed, operation 718 adds the pending waiters (including any merged waiters) from the pending waiter list to the corresponding resources. Note that sorting or other techniques can be used to find only resources (and/or ranges) with the same requestor that are adjacent, e.g., to avoid having a large pending waiter list when only relatively few resource requests can be merged. The operations of FIG. 6, described herein, can be performed to perform the state update.

Figure 8:
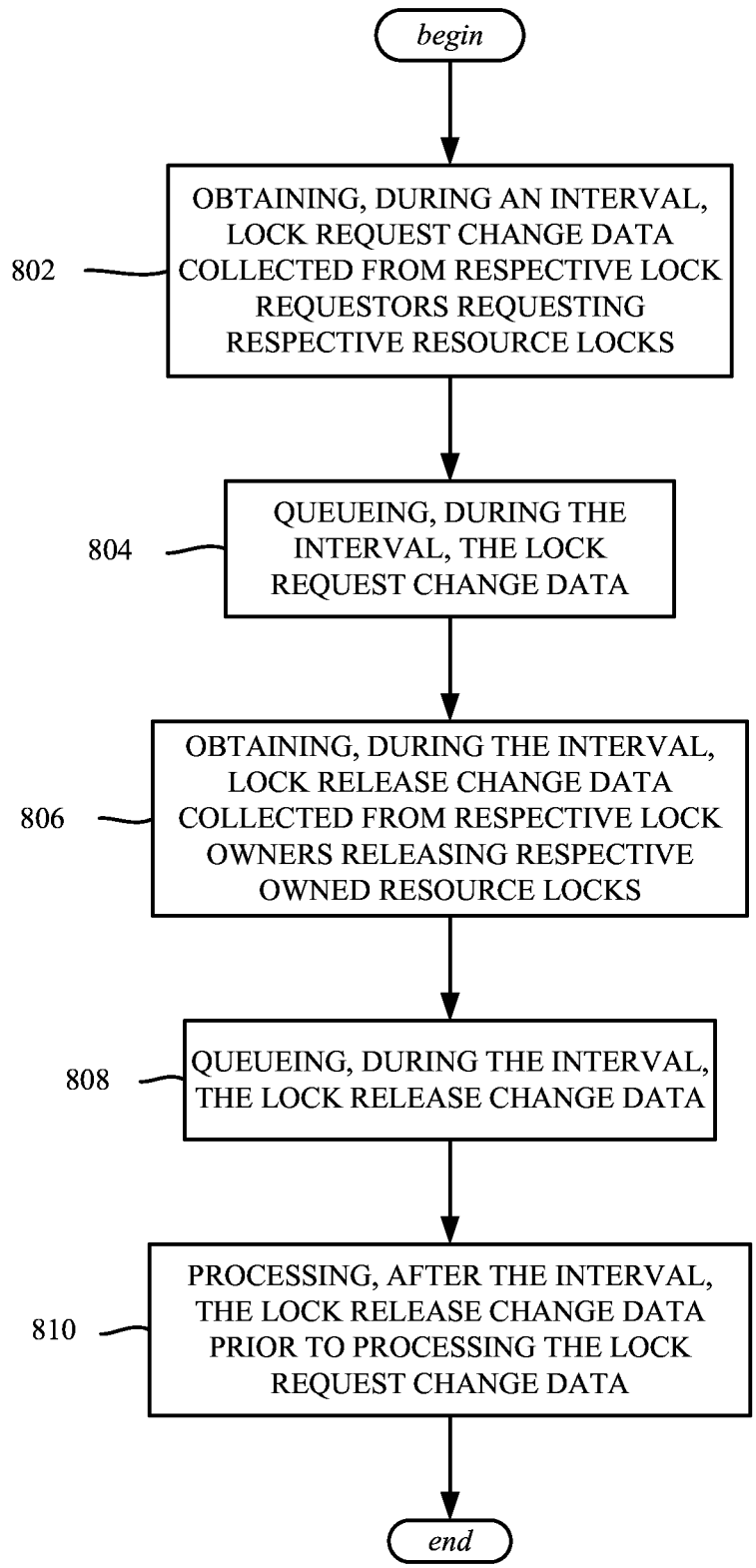
FIG. 8 is a flow diagram showing example operations related to queueing lock request messages and lock release messages for subsequent processing, in accordance with various aspects and implementations of the subject disclosure.

One or more aspects can be embodied in a system, such as represented in the example operations of FIG. 8, and for example can include a memory that stores computer executable components and/or operations, and a processor that executes computer executable components and/or operations stored in the memory. Example operations can include operation 802, which represents obtaining, during an interval, lock request change data collected from respective lock requestors requesting respective resource locks. Example operation 804 represents queueing, during the interval, the lock request change data. Example operation 806 represents obtaining, during the interval, lock release change data collected from respective lock owners releasing respective owned resource locks. Example operation 808 represents queueing, during the interval, the lock release change data. Example operation 810 represents processing, after the interval, the lock release change data prior to processing the lock request change data.

The lock request change data and the lock release change data can be collected via a coordinator of a locking system.

Processing, after the interval, the lock request change data can result in a release of a lock on a resource of a previous lock owner for which a lock request is queued, to result in a lock granted message sent to the lock requestor without sending a lock release request message to the previous lock owner.

Further operations can include adding a waiter associated with the lock requestor to the resource; processing of the lock request change data can include invoking a status update function that results in the lock granted message sent to the lock requestor.

The resource can include a first range and a second range, and processing, after the interval, the lock request change data can include combining a first lock request from a requestor for the first range of the resource with the second range of the resource from the requestor, to result in a single lock granted message sent to the lock requestor comprising both the first range and the second range.

The resource can include a range of data.

The queueing of the lock request change data and the queueing of the lock release change data can include using a single queue.

The first resource range of the second resource range can include consecutive ranges of a data resource block.

The interval can be based on at least one of: an execution thread that processes the queue, a defined time limit, a defined queue size limit or a defined queue message limit.

Figure 9:
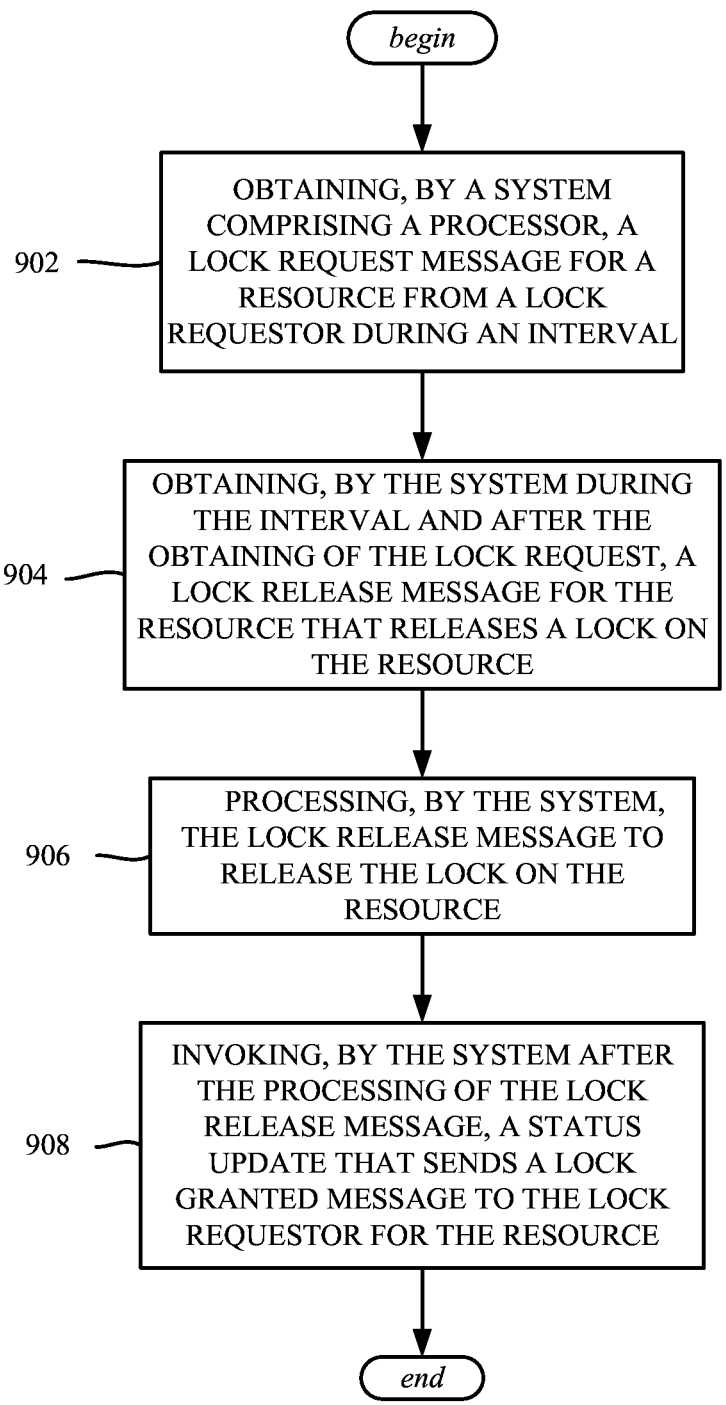
FIG. 9 is a flow diagram showing example operations related to invoking, after the processing of a lock release message, a status update that sends a lock granted message to the lock requestor for the resource, in accordance with various aspects and implementations of the subject disclosure.

One or more example aspects, such as corresponding to example operations of a method, are represented in FIG. 9. Example operation 902 represents obtaining, by a system comprising a processor, a lock request message for a resource from a lock requestor during an interval. Example operation 904 represents obtaining, by the system during the interval and after the obtaining of the lock request, a lock release message for the resource that releases a lock on the resource. Example operation 906 represents processing, by the system, the lock release message to release the lock on the resource. Example operation 908 represents invoking, by the system after the processing of the lock release message, a status update that sends a lock granted message to the lock requestor for the resource.

Invoking the status update can include invoking a state update function of a lock coordinator.

Further operations can include queueing the lock request message in a queue, and processing the queue to add a waiter associated with the lock requestor to the resource.

The resource can include a first data range and a second data range, and further operations can include combining a first lock request message from the lock requestor for the first data range and a second lock request message from the lock requestor for the second data range, to result in a single lock granted message sent to the lock requestor comprising both the first range and the second range.

The first range of the resource and the second range of the resource can include consecutive ranges.

Figure 10:
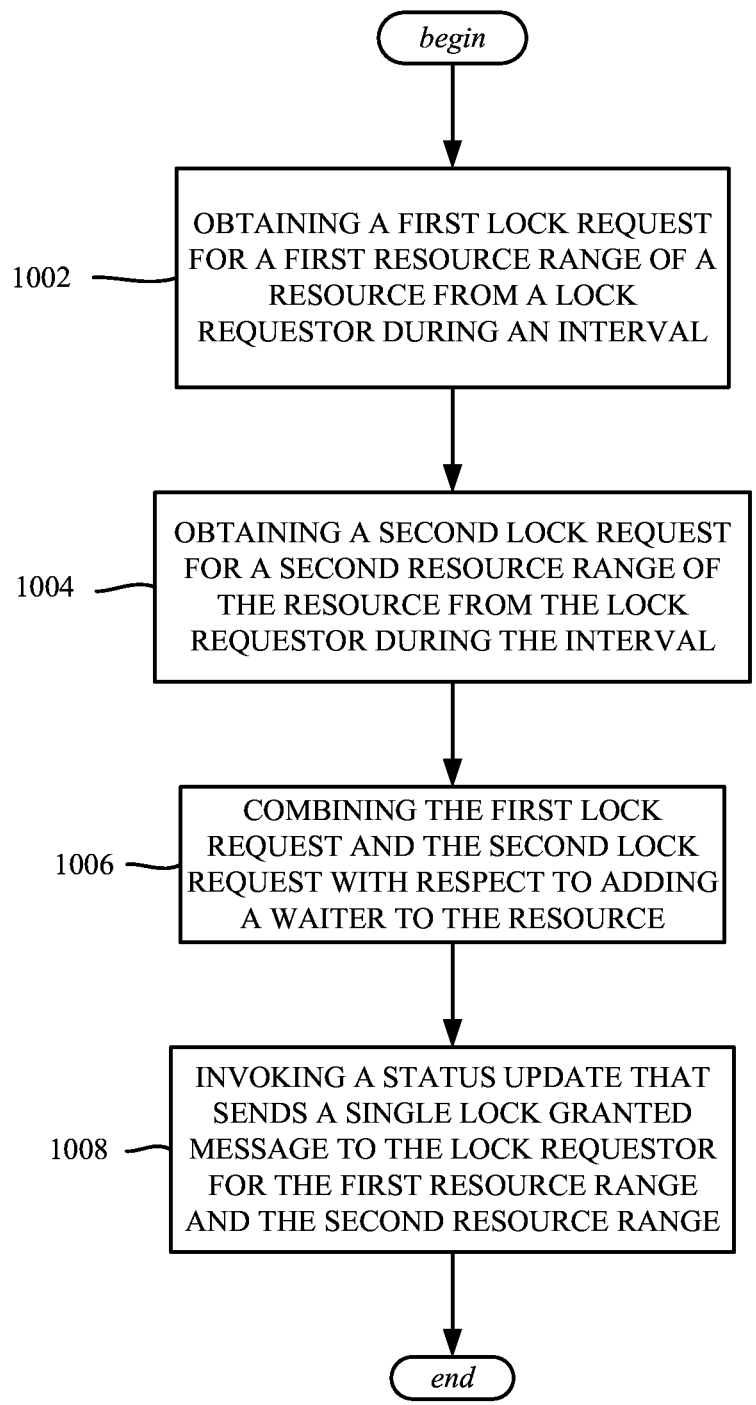
FIG. 10 is a flow diagram showing example operations related to combining two (or more) requests for the same resource with respect to adding a waiter, and invoking a status update that sends a single lock granted message to the lock requestor for the combined ranges, in accordance with various aspects and implementations of the subject disclosure.

FIG. 10 summarizes various example operations, e.g., corresponding to a machine-readable medium, comprising executable instructions that, when executed by a processor, facilitate performance of operations. Example operation 1002 represents obtaining a first lock request for a first resource range of a resource from a lock requestor during an interval. Example operation 1004 represents obtaining a second lock request for a second resource range of the resource from the lock requestor during the interval. Example operation 1006 represents combining the first lock request and the second lock request with respect to adding a waiter to the resource. Example operation 1008 represents invoking a status update that sends a single lock granted message to the lock requestor for the first resource range and the second resource range.

Invoking the status update can include invoking a state update function.

Further operations can include adding the waiter associated with the lock requestor, and associated with the first resource range combined with the second resource range, to the resource prior to invoking the status update, resulting in the single lock granted message sent to the lock requestor.

Further operations can include adding the waiter, associated with the lock requestor and the first resource range, to the resource prior to combining the first lock request and the second lock request; the combining can include increasing the first resource range of the resource based on the second resource range prior to invoking the status update, resulting in the single lock granted message sent to the lock requestor.

Further operations can include, prior to the combining, queueing the first lock request and queueing the second lock request in a queue.

Further operations can include, prior to invoking the status update, processing a lock release message that releases a previous lock that locked the first second resource range and the second resource range.

Figure 11:
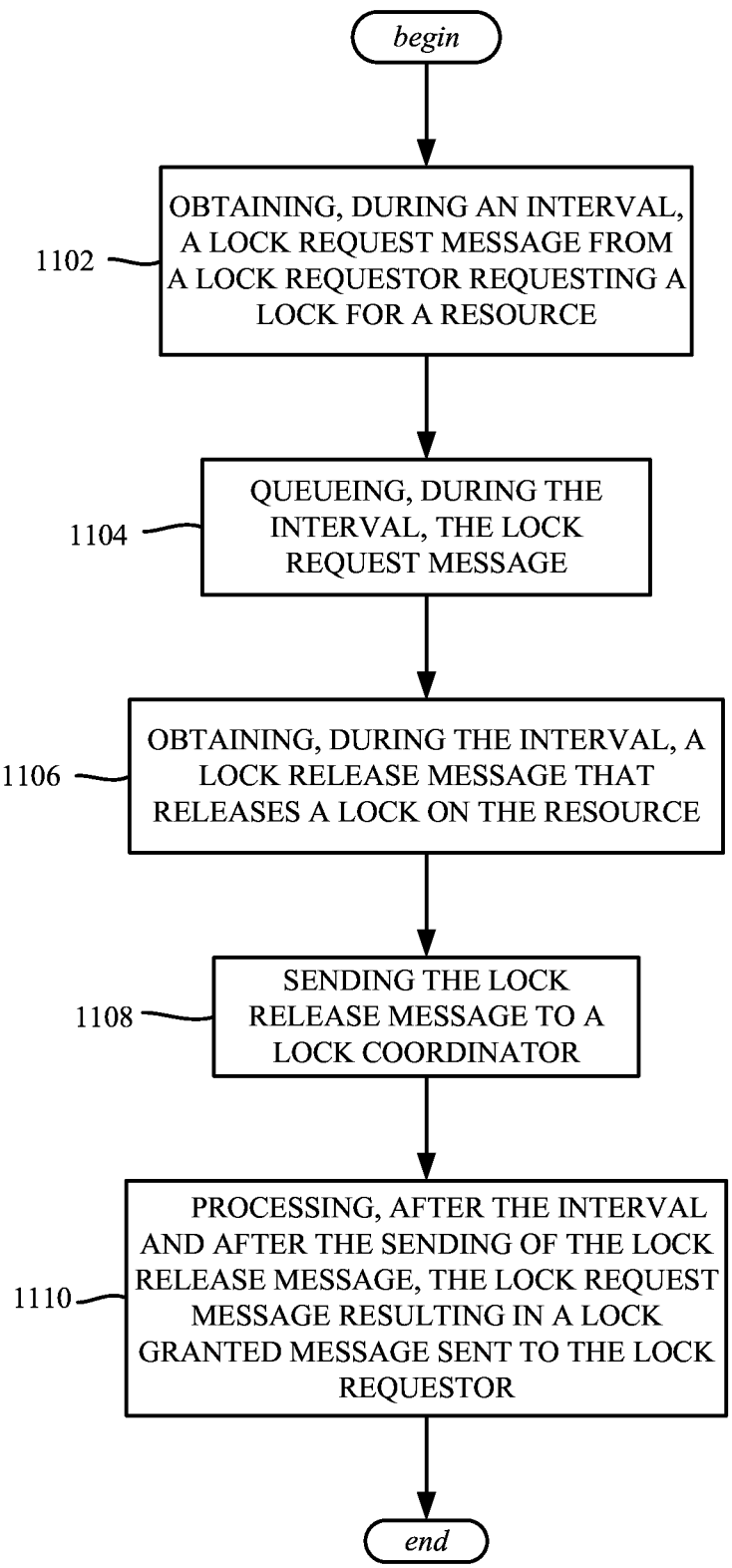
FIG. 11 is a flow diagram showing example operations related to processing, after an interval and after the sending of a lock release message, a lock request message, resulting in a lock granted message sent to the lock requestor, in accordance with various aspects and implementations of the subject disclosure.

One or more aspects can be embodied in a system, such as represented in the example operations of FIG. 11, and for example can include a memory that stores computer executable components and/or operations, and a processor that executes computer executable components and/or operations stored in the memory. Example operations can include operation 1102, which represents obtaining, during an interval, a lock request message from a lock requestor requesting a lock for a resource. Example operation 1104 represents queueing, during the interval, the lock request message. Example operation 1106 represents obtaining, during the interval, a lock release message that releases a lock on the resource. Example operation 1108 represents sending the lock release message to a lock coordinator. Example operation 1110 represents processing, after the interval and after the sending of the lock release message, the lock request message resulting in a lock granted message sent to the lock requestor.

Processing the lock request message can include adding a waiter representing the lock requestor in association with the resource, and invoking a (e.g., wake waiters) function of the lock coordinator.

The resource can include a first data range and a second data range, and processing, after the interval, the lock request message can include combining a first lock request message from the lock requestor for the first data range and a second lock request message from the lock requestor for the second data range, to result in a single lock granted message sent to the lock requestor comprising both the first range and the second range.

The first range of the resource and the second range of the resource can include consecutive ranges.

Further operations can include queueing, during the interval, the lock release message into a queue, and wherein the sending the lock release message is based on processing the queue.

Any of the elements of any of FIGS. 8-11 can be implemented as a process of producing or operating any of the elements, a non-transitory machine-readable medium, comprising executable instructions that, when executed by a processor, facilitate performance of operations of any of the elements, and/or a computer readable medium comprising instructions that, when executed, facilitate production or operation of any of the elements.

As can be seen, the technology described herein facilitates a reduction of messages in a distributed locking system in which exclusive locks are granted. This can be accomplished by collecting lock release and lock request messages during an interval, and updating the resource statuses at the end of the interval. This can result in a resource lock being released before a waiter for that resource is processed, (even if the lock release is received after the lock request), thereby granting the resource lock to the waiter's requestor without sending a lock release request message to the previous owner. This can also result in two (or more) adjacent ranges for a resource being merged, whereby only one lock granted message is sent to the requestor of the adjacent ranges. Moreover, some of the operations can preserve the property of fairness, which is desirable (e.g., to avoids starvation); adding lock requests in order and respecting this order allows preserving the property of fairness.

Figure 12:
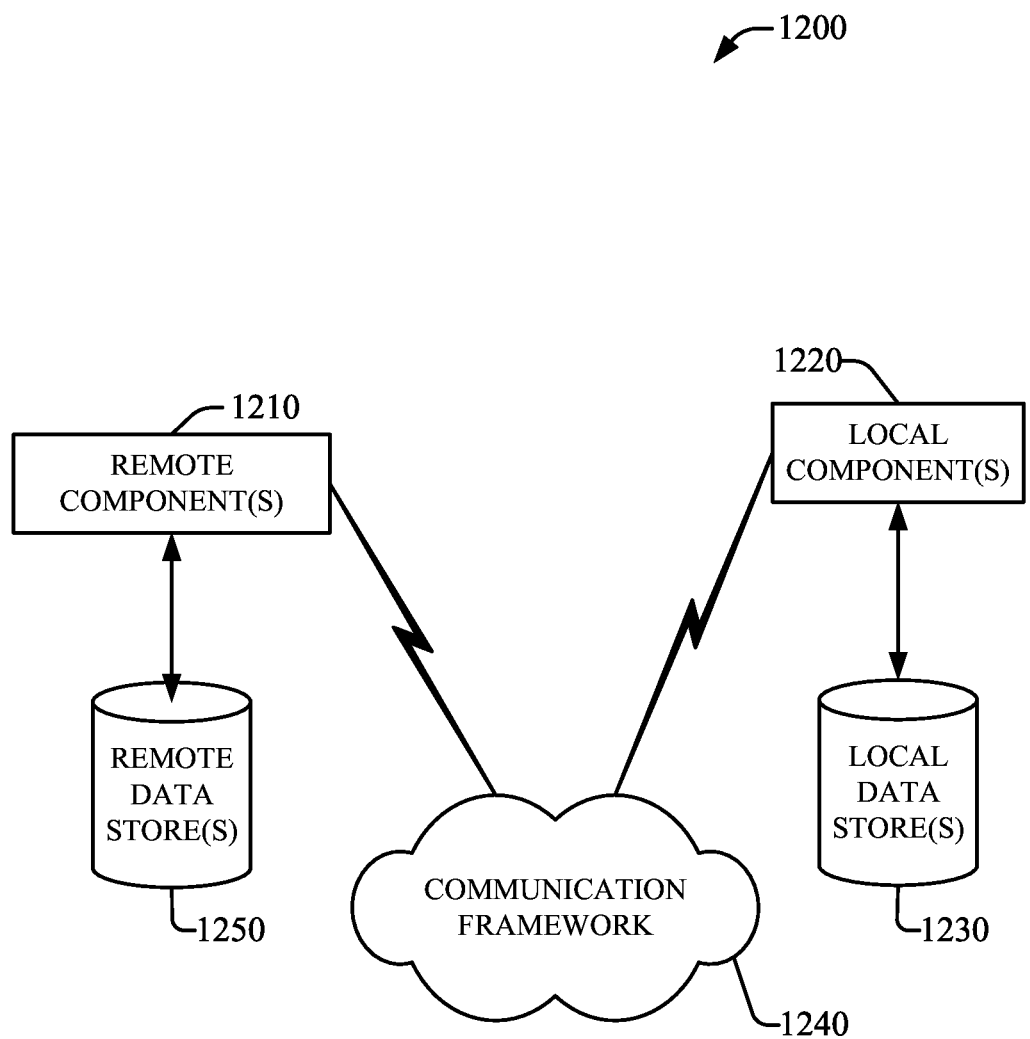
FIG. 12 is a block diagram representing an example computing environment into which aspects of the subject matter described herein may be incorporated.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
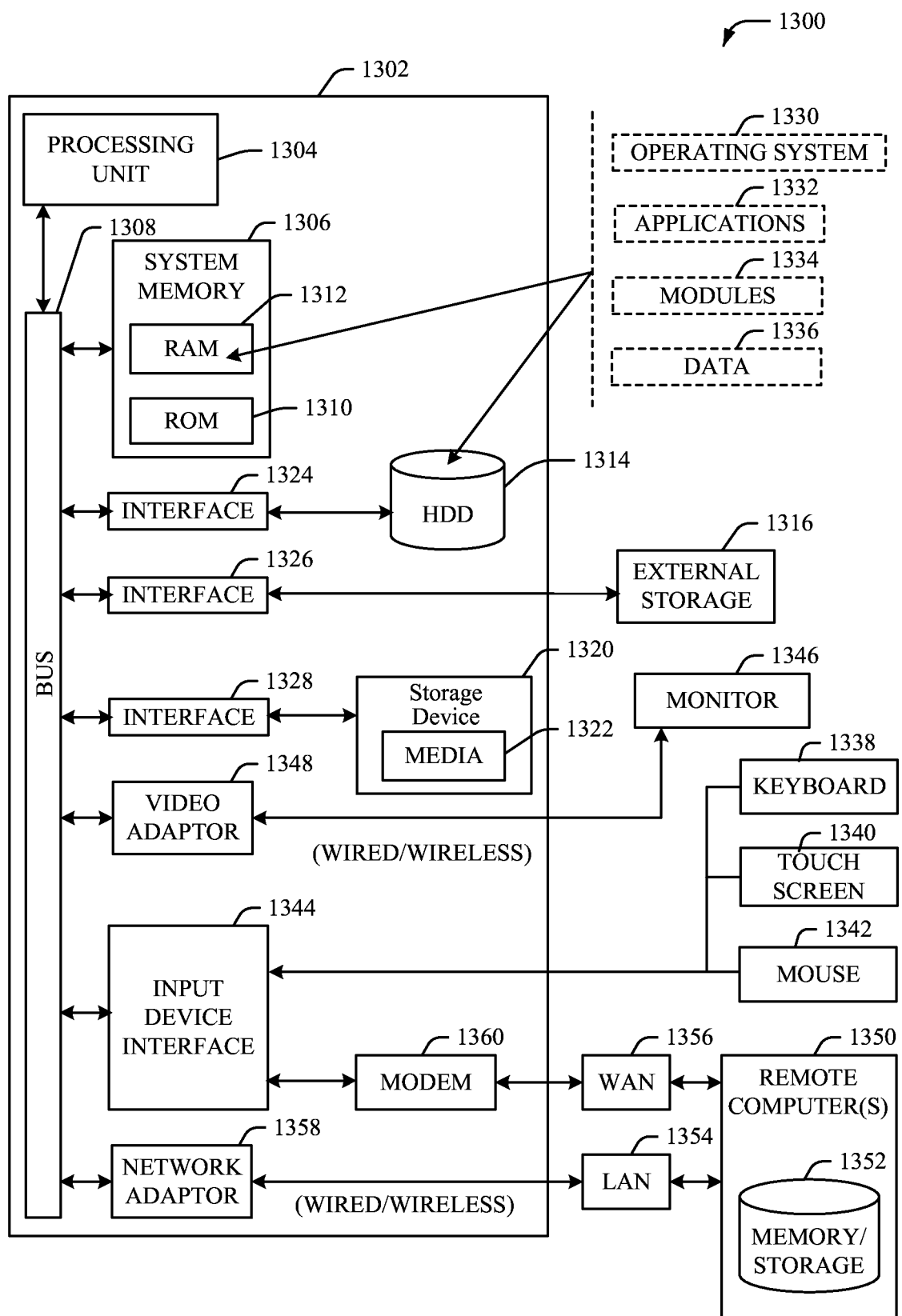
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
obtaining, during an interval, lock request change data collected from respective lock requestors requesting respective resource locks;
queueing, during the interval, the lock request change data;
obtaining, during the interval, lock release change data collected from respective lock owners releasing respective owned resource locks;
queueing, during the interval, the lock release change data; and
processing, after the interval, the lock release change data prior to processing the lock request change data.

2. The system of claim 1, wherein the lock request change data and the lock release change data are collected via a coordinator of a locking system.

3. The system of claim 1, wherein the processing, after the interval, the lock request change data results in a release of a lock on a resource of a previous lock owner for which a lock request is queued, to result in a lock granted message sent to the lock requestor without sending a lock release request message to the previous lock owner.

4. The system of claim 3, wherein the operations further comprise adding a waiter associated with the lock requestor to the resource, and wherein the processing of the lock request change data comprises invoking a status update function that results in the lock granted message sent to the lock requestor.

5. The system of claim 1, wherein the resource comprises a first range and a second range, and wherein the processing, after the interval, the lock request change data comprises combining a first lock request from a requestor for the first range of the resource with the second range of the resource from the requestor, to result in a single lock granted message sent to the lock requestor comprising both the first range and the second range.

6. The system of claim 1, wherein the resource comprises a range of data.

7. The system of claim 1, wherein the queueing of the lock request change data and the queueing of the lock release change data comprises using a single queue.

8. The system of claim 1, wherein the first resource range of the second resource range comprise consecutive ranges of a data resource block.

9. The system of claim 1, wherein the interval is based on at least one of: an execution thread that processes the queue, a defined time limit, a defined queue size limit or a defined queue message limit.

10. A method, comprising:
obtaining, by a system comprising a processor, a lock request message for a resource from a lock requestor during an interval;
obtaining, by the system during the interval and after the obtaining of the lock request, a lock release message for the resource that releases a lock on the resource;
processing, by the system, the lock release message to release the lock on the resource; and
invoking, by the system after the processing of the lock release message, a status update that sends a lock granted message to the lock requestor for the resource.

11. The method of claim 10, wherein the invoking of the status update comprises invoking a state update function of a lock coordinator.

12. The method of claim 10, further comprising queueing, by the system, the lock request message in a queue, and processing the queue to add a waiter associated with the lock requestor to the resource.

13. The method of claim 10, wherein the resource comprises a first data range and a second data range, and further comprising combining, by the system, a first lock request message from the lock requestor for the first data range and a second lock request message from the lock requestor for the second data range, to result in a single lock granted message sent to the lock requestor comprising both the first range and the second range.

14. The method of claim 13, wherein the first range of the resource and the second range of the resource comprise consecutive ranges.

15. A non-transitory machine-readable medium, comprising executable instructions that, when executed by a processor, facilitate performance of operations, the operations comprising:
obtaining a first lock request for a first resource range of a resource from a lock requestor during an interval;
obtaining a second lock request for a second resource range of the resource from the lock requestor during the interval;
combining the first lock request and the second lock request with respect to adding a waiter to the resource; and
invoking a status update that sends a single lock granted message to the lock requestor for the first resource range and the second resource range.

16. The non-transitory machine-readable medium of claim 15, wherein the invoking of the status update comprises invoking a state update function.

17. The non-transitory machine-readable medium of claim 15, wherein the operations further comprise adding the waiter associated with the lock requestor, and associated with the first resource range combined with the second resource range, to the resource prior to invoking the status update, resulting in the single lock granted message sent to the lock requestor.

18. The non-transitory machine-readable medium of claim 15, wherein the operations further comprise adding the waiter, associated with the lock requestor and the first resource range, to the resource prior to combining the first lock request and the second lock request, and wherein the combining comprises increasing the first resource range of the resource based on the second resource range prior to invoking the status update, resulting in the single lock granted message sent to the lock requestor.

19. The non-transitory machine-readable medium of claim 15, wherein the operations further comprise, prior to the combining, queueing the first lock request and queueing the second lock request in a queue.

20. The non-transitory machine-readable medium of claim 15, wherein the operations further comprise, prior to invoking the status update, processing a lock release message that releases a previous lock that locked the first second resource range and the second resource range.

* * * * *